United States Patent [19]

Tanabe

[11] 3,991,862
[45] Nov. 16, 1976

[54] DAMPING FORCE GENERATING DEVICE IN SHOCK ABSORBER

[75] Inventor: Hisao Tanabe, Yokohama, Japan

[73] Assignee: Tokico Ltd., Japan

[22] Filed: June 24, 1975

[21] Appl. No.: 589,839

[30] Foreign Application Priority Data
June 28, 1974 Japan.............................. 49-74163

[52] U.S. Cl.................................. 188/282; 138/42
[51] Int. Cl.².......................................... F16F 9/348
[58] Field of Search .......... 188/282, 317, 318, 320, 188/322; 138/40, 42

[56] References Cited
UNITED STATES PATENTS

2,732,039  1/1956  Funkhouser et al................ 188/282
3,837,445  9/1974  Pierle............................. 188/320 X Primary Examiner—George E. A. Halvosa
Attorney, Agent, or Firm—Wenderoth, Lind & Ponack

[57] ABSTRACT

A damping force generating device in a shock absorber having a pressure tube containing fluid therein and an oil space partitioning member, which device includes a first annular disc having a plurality of cut-outs in the outer periphery thereof and a second annular disc having a plurality of cut-outs in the outer periphery thereof, the cut-outs in the first and second discs being adapted to form a fixed orifice of a predetermined aperture area when the discs are mounted on the oil space partitioning member overlapping each other, irrespective of the relative angular positions of the discs.

6 Claims, 20 Drawing Figures

DAMPING FORCE GENERATING DEVICE IN SHOCK ABSORBER

DESCRIPTION OF PRIOR ART

This invention relates to a damping force generating device in a shock absorber containing fluid sealed in the interior of the shock absorber.

Figure 1:
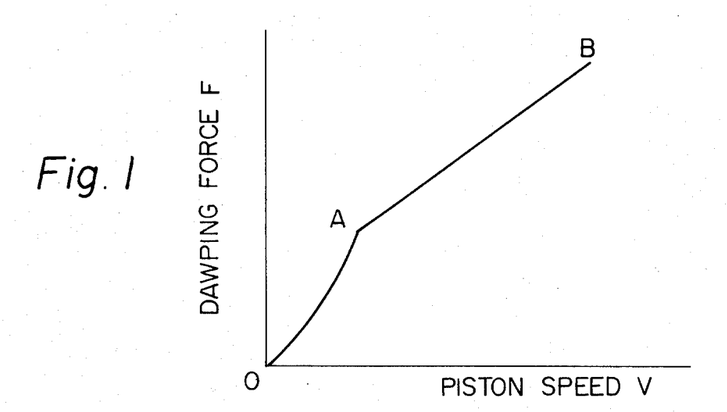
FIG. 1 is a diagram showing typical damping force characteristics of a shock absorber of the type to which the invention relates.

Usually, a shock absorber containing fluid therein is designed to have damping force characteristics as shown in FIG. 1, namely, when the piston speed is low a portion OA in the characteristic curve is produced by means of a fixed orifice and, when the piston speed exceeds a predetermined value a portion AB in the characteristic curve is produced by means of a valve in a damping force generating device opens under such condition.

In the shock absorber of the prior art, the fixed orifices for generating a damping force when the piston speed is low have been constituted by apertures through an oil space partitioning member such as a piston slidably disposed in the shock absorber or a bottom member for connecting inner and outer tubes of a dual-tube type shock absorber, or by cut-outs formed in or adjacent to the valve seat. Therefore, it has been required to change the size of the apertures through the piston or to change the configuration of the cut-outs formed in for the valve seat in changing the low speed damping force characteristics and, therefore, it has been necessary to prepare many kinds of pistons having different sizes or configuration of the apertures or the cut-outs for the manufacturer of the shock absorber, and thus problems in manufacture and in stock control have arisen.

BRIEF SUMMARY OF INVENTION

According to the present invention, a damping force generating device for a shock absorber comprising an oil space partitioning member disposed in a pressure tube containing fluid therein is provided with a fixed orifice constituted by a first disc having a plurality of cut-outs formed in the outer periphery of the disc, each of the cut-outs having the same configuration and being equally spaced circumferentially relative to each other, and by a second disc overlapping the first disc and having a plurality of cut-outs in the outer periphery thereof, the cut-outs in the first and second discs being such that apertures having a predetermined total area are formed by overlapping the first and second discs with respect to each other irrespective of the relative angular positions of the discs.

Preferably, the cut-outs in the first disc are formed such that each of the cut-outs has a circumferential angle of $360°/2n$, where $n$ is an integer, and is spaced from the adjacent cut-out by a circumferential angle of $360°/2n$.

According to one aspect of this invention, each of the cut-outs in the second disc is formed to have a circumferential angle of $360°/n$, and the cut-outs are arranged along the circumference of the second disc such that the cut-outs do not overlap each other.

BRIEF DESCRIPTION OF DRAWINGS

The invention will now be further described, by way of example, with reference to the accompanying drawings in which:

FIG. 5 comprising FIG. 5A

DETAILED DESCRIPTION OF EMBODIMENTS

Figure 2:
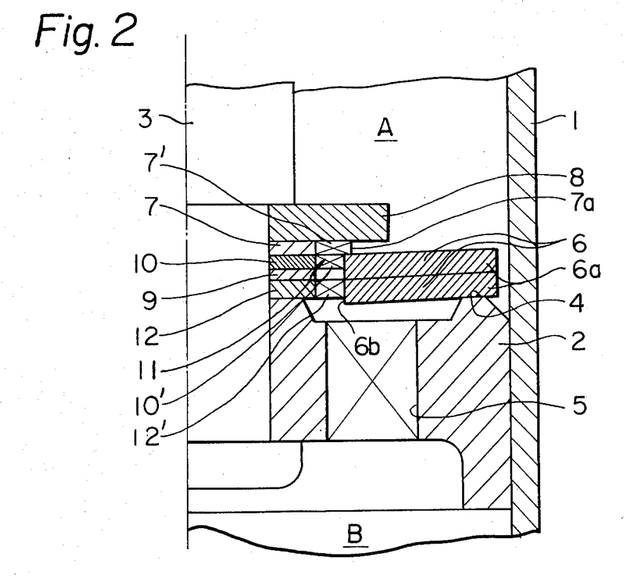
FIG. 2 is a partial cross-sectional view of an embodiment of the invention.

FIG. 2 is a cross-sectionl view showing an essential part of a shock absorber according to the invention. The shock absorber comprises a pressure tube or cylinder 1 containing gas and liquid sealed therein, and a piston 2 slidably and sealingly received in the cylinder 1. The piston 2 divides the interior of the cylinder 1 into two spaces or chambers A and B, and thus acts as an oil space partitioning member of the shock absorber. Shown at 3 is a piston rod secured with the piston 2. An annular valve seat 4 is formed in the piston 2 at the side facing the space A. Shown at 5 is a hole through the piston 2 for connecting the two spaces A and B with each other when the valve formed by the valve seat 4 and a valve member is open. The holes 5 are disposed radially inwardly relative to the valve seat 4. The valve member for cooperating with the valve seat 4 is in the form of an annular valve disc 6, the outer circumferential portion 6a of the valve disc 6 normally engaging with the valve seat 4. In the embodiment shown in the drawing, the valve disc 6 comprises two mutually overlapping discs, but it may be formed of single disc member. Shown at 7 is an annular disc having a plurality of cut-outs 7' in the outer circumferential portion, and at 10 is an annular disc also having a plurality of cut-outs 10' in the outer circumferential portion. The discs 7 and 10 constitute the first and second discs according to the present invention which will be explained in detail hereinafter. The discs 7 and 10 overlap each other, and are mounted on the piston rod 3 together with spacers 9 and a washer 8. The cut-outs 7' and 10' in the discs 7 and 10 cooperate to form a fixed size orifice 11 which acts to connect the spaces A and B permanently. The inner circumferential edge 6b of the valve disc 6 engages the outer circumferential edge portion 7a of the disc 7. Shown at 12 is an annular disc having cut-outs 12' in the outer circumferential portion thereof. The disc 12 acts to guide and retain the inner circumferential edge 6b of the valve disc 6 in the proper position. Thus, when the piston 2 moves upward in the drawing and when the piston speed is low, low damping force characteristic OA in FIG. 1 will be attained by means of the fixed orifice 11, and when piston speed exceeds a predetermined value, the valve disc 6 will warp downward such that the inner circumferential edge 6b moves downward from the normal rest position shown in the drawing. When piston speed increases further and the displacement of the inner edge 6b of the valve disc 6 exceeds the thickness of the disc 10, a large flow passage area will be formed between the inner edge 6b and the disc 10, and thereby damping force characteristic curve AB in FIG. 1 will be obtained. It will be noted that the disc 10 acts to form the fixed orifice 11 by cooperating with the disc 7 and also acts to determine the valve opening position, namely the position of point A in FIG. 1, by means of the thickness of the disc 10.

Although the embodiment shown in FIG. 2 includes a piston 2 having the feature in accordance with the present invention, it should be understood that the invention can be applied to the bottom member of a shock absorber when the bottom member acts as an oil space partitioning member in a shock absorber of the dual-tube type or the like.

Figure 3:
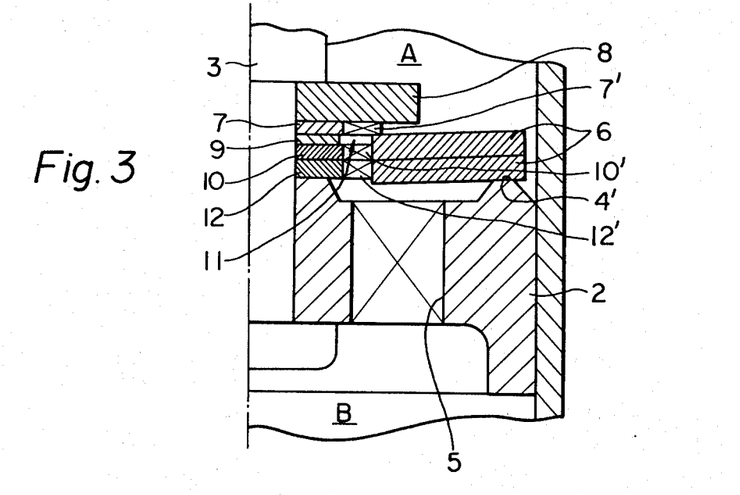
FIG. 3 and FIG. 4 are cross-sectional views of modified versions respectively.
Figure 4:
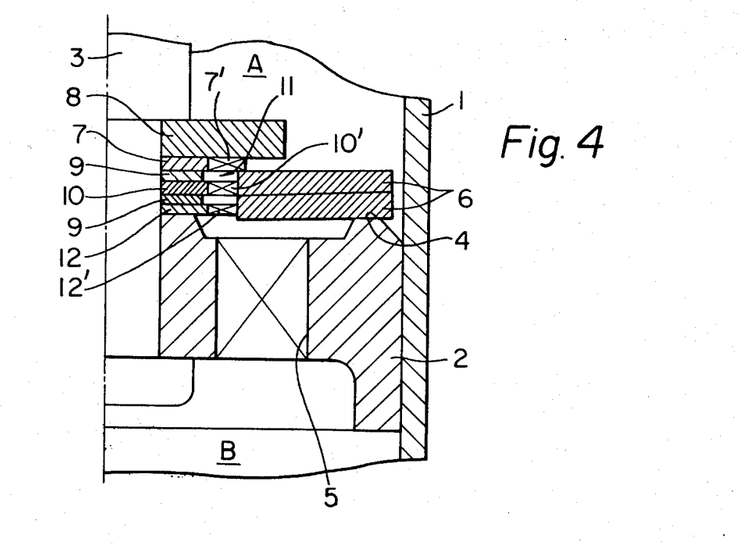

In FIG. 2, the discs 7 and 10 directly overlap each other, but a spacer 9 may be interposed between the two discs 7 and 10 as shown in FIG. 3. Also as shown in FIG. 4, a spacer 9 may be disposed between two discs 7 and 10 and, another spacer 9 may be disposed between the disc 10 and the disc 12. Further, the positions of the discs 7 and 10 may be interchanged with each other.

Now, the configuration of cut-outs formed in the discs 7 and 10 will be described.

The first disc 7 of this invention, has a plurality of cut-outs formed in the outer periphery of the disc such that each of the cut-outs has the same configuration and is equally spaced in the circumferential direction from adjacent cut-outs. In forming the cut-outs, an even number of radii 13 are drawn from the center of the discs, as shown in each of FIGS. 5A–12A. A cut-out 7' is formed in every other circumferential portion 7a defined between adjacent radii 13. Thus, two types of disc 7, namely, a first type having even number of cut-outs 7' as shown in FIGS. 5A–8A and a second type having odd number of cut-outs as shown in FIGS. 9A–12A will be obtained.

A description will be given hereinafter in connection with each of the combinations of the discs 7 and 10.

1. Combination of the disc 7 having an even number of cut-outs 7' and the disc 10 having even number of cut-outs 10'.

Figure 6A:
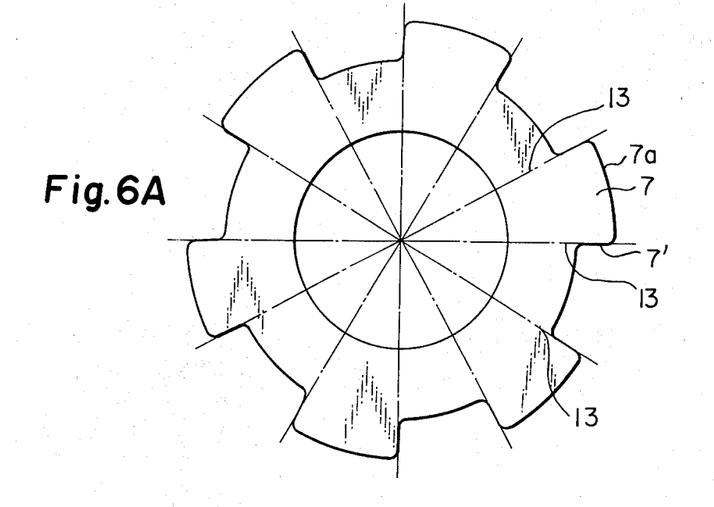
FIGS. 6A and 6B show a modified form of the discs according to FIG. 5.

The embodiment shown in FIG. 6A is a disc 7 having six cut-outs 7' in the outer peripheral portion which are formed by twelve radii 13 equally dividing the circumference and by forming the cut-outs in every other portion 7a which is defined between adjacent radii as shown. The disc 10 shown in FIG. 6B has 12 cut-outs 10' equally spaced relative to each other, the cut-outs 10' being such that each of the cut-outs 10' extends oppositely from each of the radii 13 for an equal distance. The cut-outs 7' and 10' have different circumferential lengths, for defining a predetermined aperture area when the two discs are positioned so as to overlap each other.

Figure 5A:
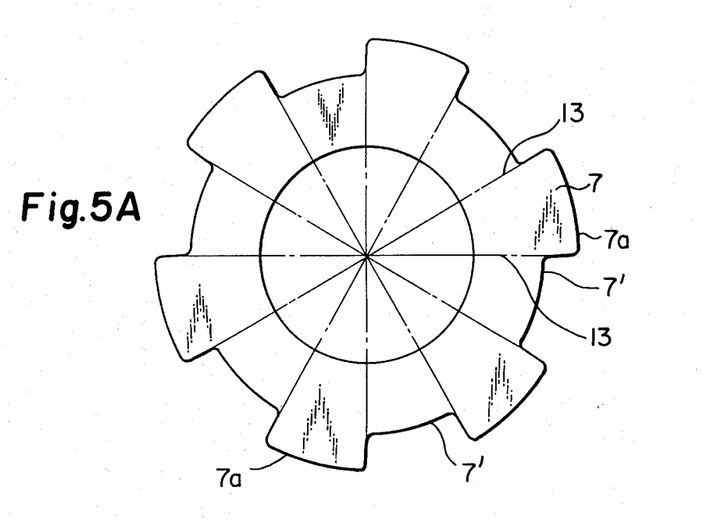
Figure 5B:
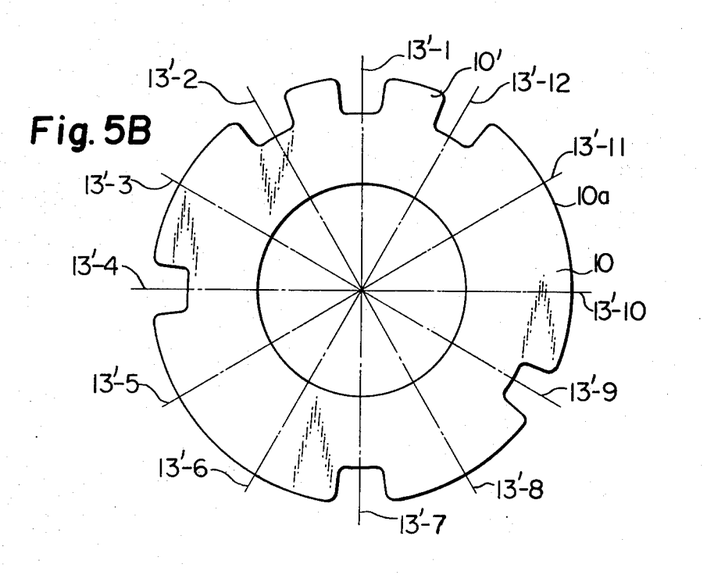
FIG. 5B shows configuration of the first and second discs according to the invention.
Figure 6B:
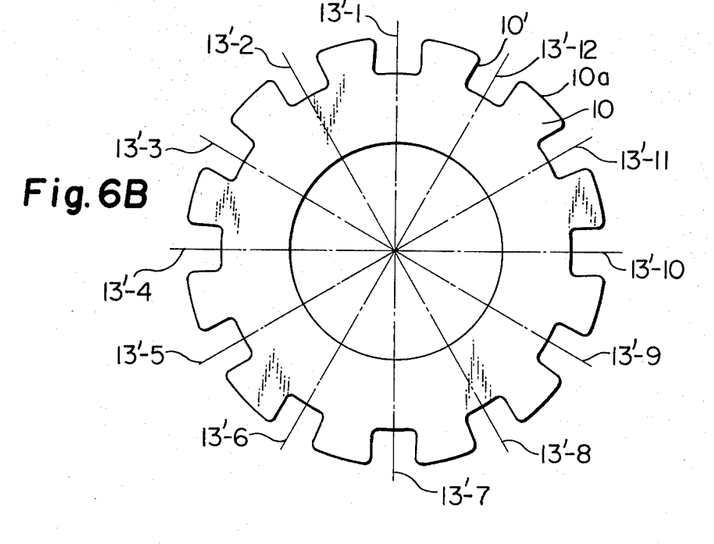

FIG. 5 shows a modified form of FIG. 6 in which, the cut-outs 7' of the disc 7 are identical to those of the disc 7 in FIG. 6, namely, each of the cut-outs 7' occupies a circumferential angle of 360°/12 and is spaced from adjacent cut-outs by a circumferential angle of 360°/12. The disc 10 of FIG. 5B has six cut-outs 10' each of which has a similar configuration to each of the cut-outs 10' of FIG. 6B, but the cut-outs 10' of FIG. 5B are disposed respectively to include the radii 13'-1, 13'-2, 13'-4, 13'-7, 13'-9 and 13'-12 respectively. It will be understood that any even number of cut-outs 10' may be formed provided that half of them are selected from the group lying on the odd numbered radii 13'-1, 13'-3, 13'-5, . . . 13'-11 and remaining half are selected from the group lying on the even numbered radii 13'-2, 13'-4, . . . 13'-12.

2. Combination of the disc 7 having an even number of cut-outs 7' and the disc 10 having an odd or even number of cut-outs.

Figure 7A:
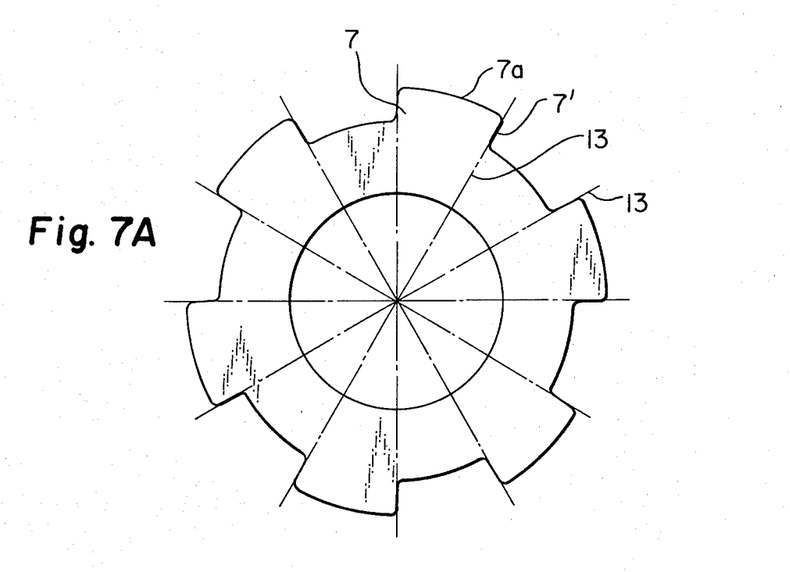
FIGS. 7A and 7B show a modified form of the discs of FIGS. 6A and 6B.
Figure 7B:
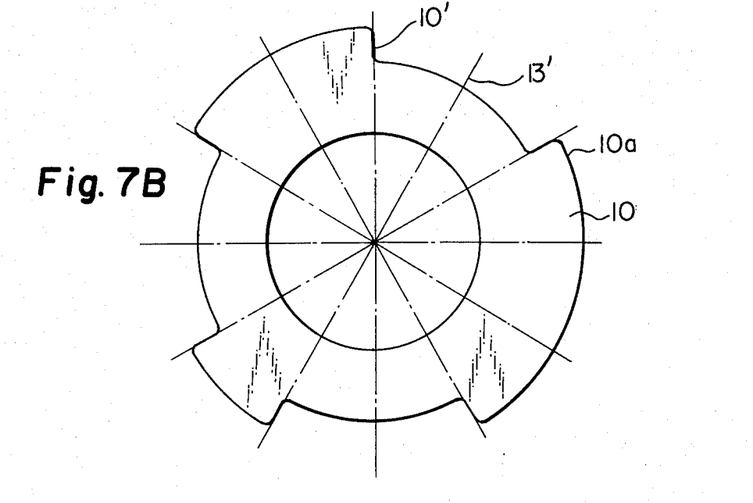
Figure 8A:
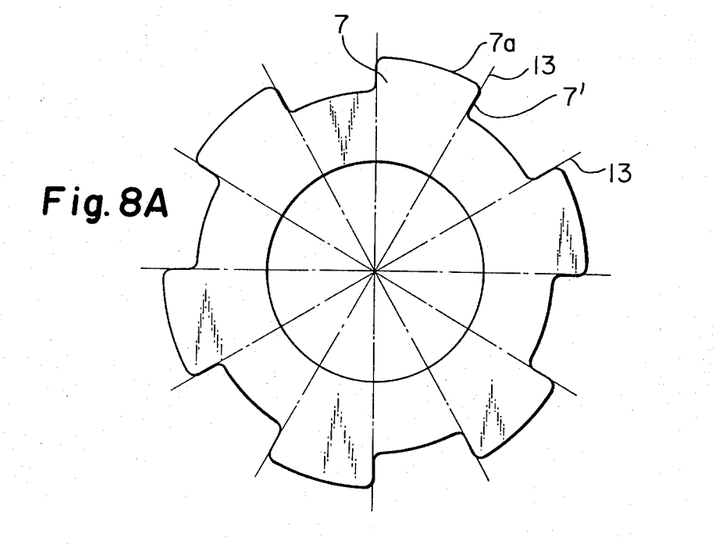
FIGS. 8A and 8B show a modified form of the discs of FIGS. 7A and 7B.
Figure 8B:
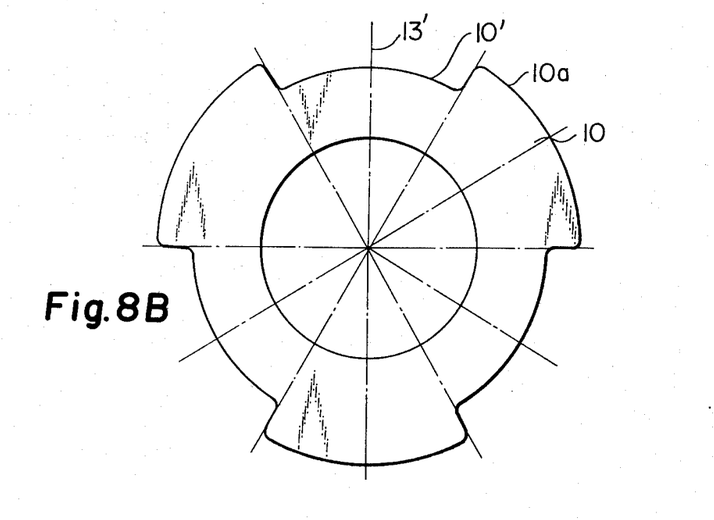

FIG. 8A shows a disc 7 having six cut-outs 7' similar to those shown in FIGS. 5A and 6A. FIG. 8B shows a disc 10 having three cut-outs 10' each of which has a circumferential angle of 360°/6 which is twice as large as the cut-outs 7' each having a circumferential angle of 360°/12. Although the cut-outs 10' of FIG. 8B are spaced equally from each other, it should be noted that the cut-outs may be arranged at any desired angular positions relative to each other as shown in FIG. 7B. Further, it should also be noted that any desired number of cut-outs 10', provided that the adjacent cut-outs do not overlap each other.

3. Combination of the disc 7 having an odd number of cut-outs 7' and the disc 10 having an even number of cut-outs 10'.

Figure 9A:
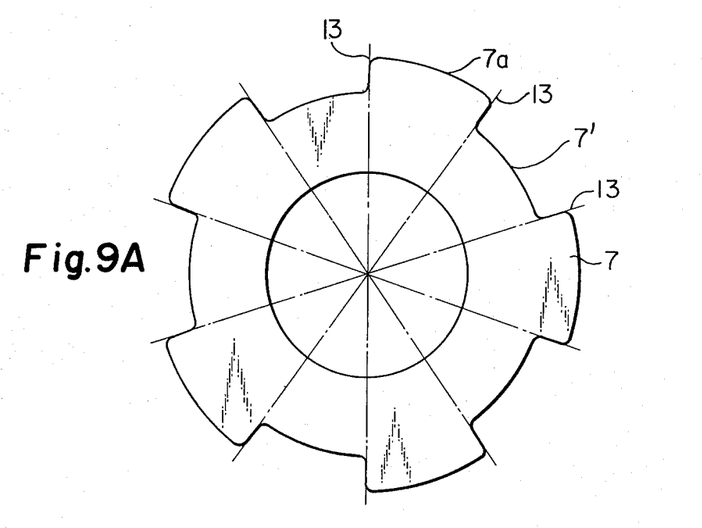
FIGS. 9A and 9B show a further modified form of the first and second discs according to the present invention.

FIG. 9A shows a disc 7 having five cut-outs 7' each of which has a circumferential angle of 360°/10 and which spaced from the adjacent cut-outs by the same angle of 360°/10. In other words, the cut-outs 7' are formed in every other circumferential portion each of which is defined between two adjacent radii dividing the circumference of the disc equally into $2(2n-1)$ portions, where $n$ is an integer.

Figure 9B:
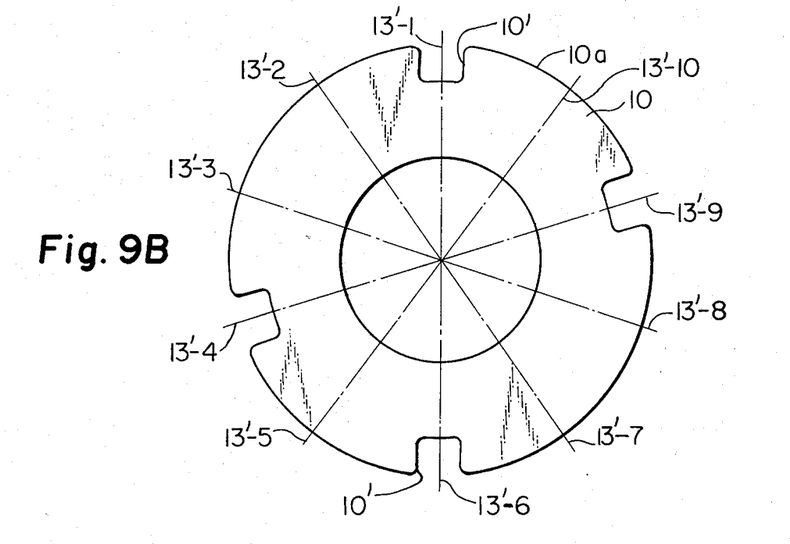

The second disc 10 shown in FIG. 9B has four cut-outs 10' each of which extends oppositely in circumferential direction from each of the specified radii 13'-1, 13'-4, 13'-6 and 13'-9. It should also be noted that these specified radii may be any even number provided that half of them are selected from the group consisting of odd numbered radii 13'-1, 13'-3, . . . 13'-9 and the remaining half are selected from the group consisting of even numbered radii 13'-2, 13'-4, . . . 13'-10.

Figure 10A:
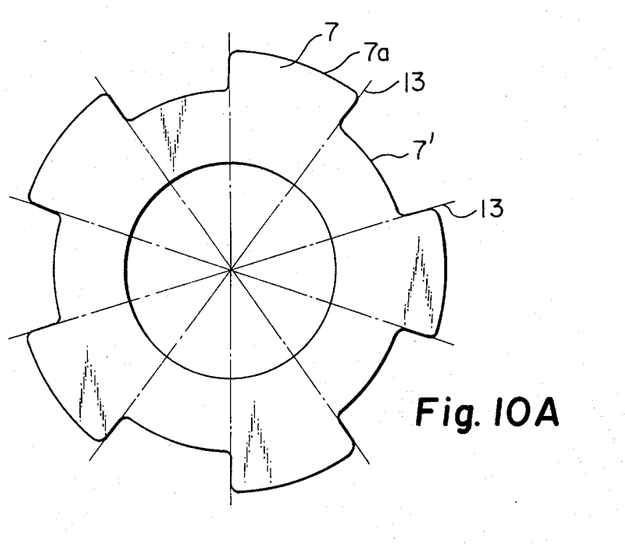
FIGS. 10A and 10B show a modified form of the discs of FIGS. 9A and 9B.
Figure 10B:
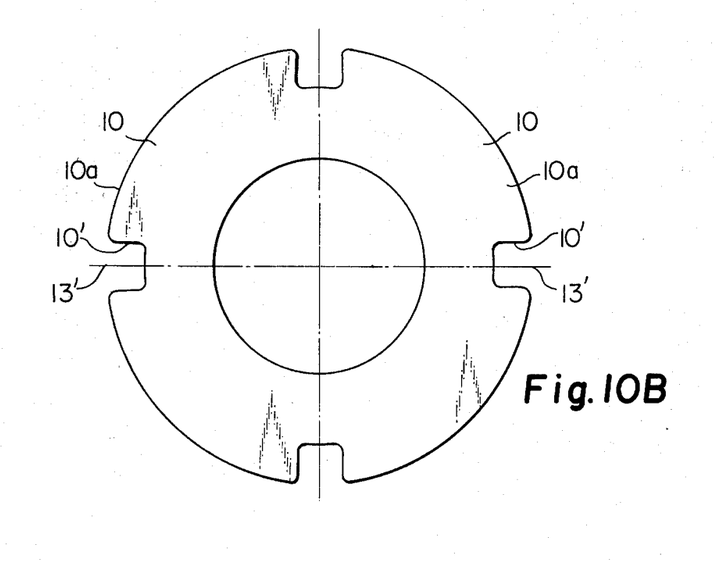

The disc 10 shown in FIG. 10B is a modified form of that in FIG. 9B in which two pairs of cut-outs 10' are shown. Each pair of cut-outs is disposed on a diameter. In such case the angular position of each diameter may be determined as required. Further, the cut-outs 10 may be consisted by any desired number of pairs, provided that the cut-outs constituting a pair have the same circumferential angle and that the cut-outs do not overlap each other.

4. Combination of the disc 7 having an odd number of cut-outs and the disc 10 having an odd or even number of cut-outs.

Figure 11A:
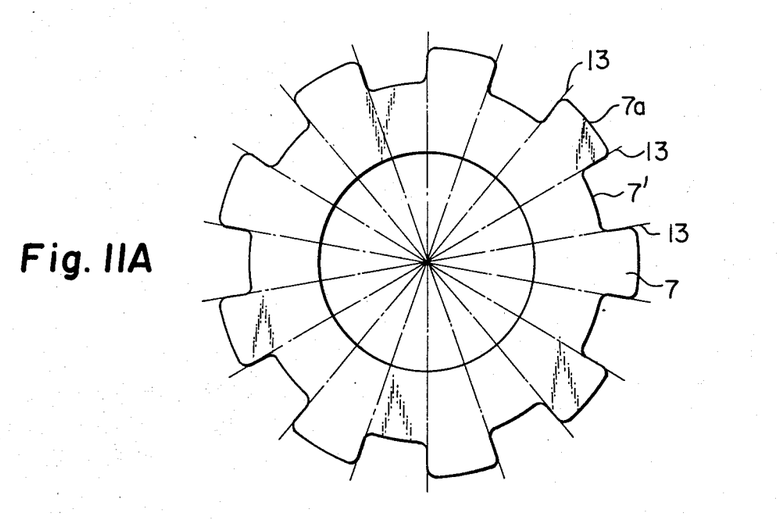
FIGS. 11A and 11B show a further modified form of the discs of FIGS. 9A and 9B.
Figure 12A:
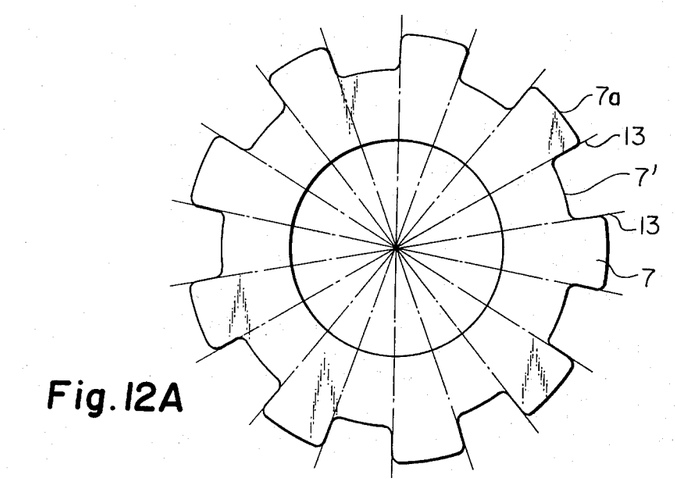
FIGS. 12A and 12B show a modified form of the discs of FIGS. 11A and 11B.

Shown in FIG. 11A and FIG. 12A is the disc 7 having nine cut-outs 7' in the outer circumferential portion of the discs respectively. Each of the cut-outs 7' has a circumferential angle of 360°/18 and is spaced from adjacent cut-outs 7' by a circumferential angle of 360°/18. In other words, the cut-outs are formed by cutting-out alternate circumferential portions defined by two adjacent radii 13 which divide the circumference equally into $2(2n-1)$ portions, where $n$ is an integer.

Figure 11B:
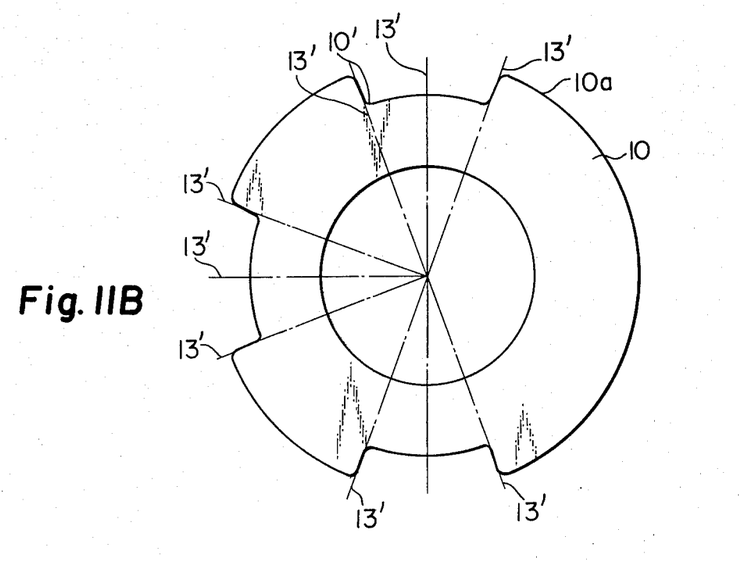
Figure 12B:
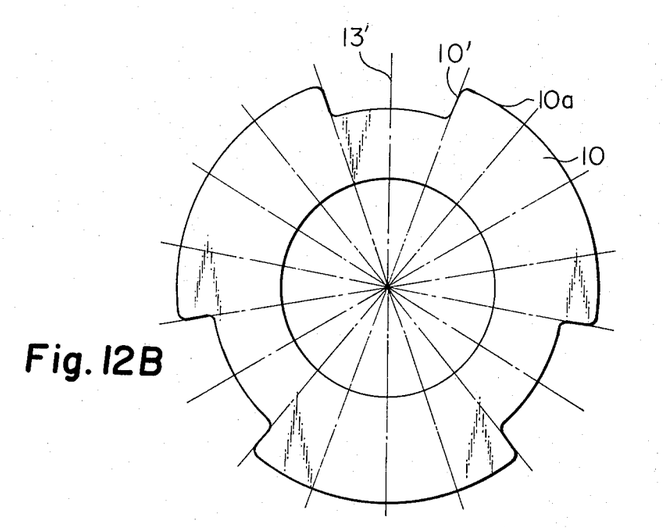

The disc 10 shown in FIG. 12B has three cut-outs 10' each of which has a circumferential angle of 360°/9. The spaces between respective cut-outs 7' are shown to be equal relative to each other in FIG. 12B, but it may be changed as desired as shown in FIG. 11B. Although the embodiments shown in FIGS. 11B and 12B have three cut-outs around the circumference, it should be understood that any number of cut-outs may be formed at desired relative positions provided that the cut-outs do not overlap each other and that the cut-outs have a circumferential angle twice (4 times, 6 times . . . ) of that of the cut-outs 7' of the disc 7.

As described above, the first disc 7 of this invention has cut-outs having a circumferential angle of 360°/2n, where n denotes any suitable integer, each of which is spaced from adjacent cut-out by the same circumferential angle of 360°/2n, and the second disc 10 has cut-outs 10' which are formed as described clearly with reference to the embodiments. Thus, the discs 7 and 10 act to form a predetermined total aperture area irrespective of the relative angular positions when the discs are overlapped with each other.

Therefore, the following advantages will be obtained according to the invention.

a. In assembling the shock absorber, it is not required to pay any special attention to the angular positions of the discs.

b. The fixed orifice is not required to be formed in the oil space partitioning member such as a piston, thus problems in manufacture and stock control of the member will be substantially improved.

c. The discs forming the fixed orifice may be formed from steel plate or the like by means of simple press working, and thus the cost may be reduced substantially.

I claim:

1. A damping force generating device for a shock absorber having an oil space partitioning member disposed in a pressure chamber containing oil therein for dividing the pressure chamber into two oil spaces, said oil space partitioning member having an opening therein for placing the two oil spaces in communication and an annular resilient valve member operatively associated with said oil space partitioning member for controlling oil flow through the opening, said device comprising a first annular disc having a plurality of cut-outs in the outer circumferential portion thereof, and a second annular disc having a plurality of cut-outs in the outer circumferential portion thereof and being disposed in overlapping relationship with the first disc, said second disc normally engaging the inner circumference of the annular valve member for guiding the movement thereof, the outer circumferential portion of said first disc abutting the inner circumferential portion of the valve member and acting as a valve seat therefor, and said cut-outs in the first and second discs together forming a fixed orifice having a predetermined aperture area, irrespective of the relative angular positions of the disc for placing the two oil spaces permanently in communication with each other.

2. A damping force generating device according to claim 1, in which each of the cut-outs in the first disc has a circumferential angle of 360°/2n, where n is an integer, and is spaced from adjacent cut-outs by the same circumferential angle of 360°/2n.

3. A damping force generating device according to claim 2, in which each of the cut-outs in the second disc has a circumferential angle of 360°/n.

4. A damping force generating device according to claim 2, in which n is an odd number and the cut-outs formed in said second disc are a pair of cut-outs symmetrically disposed at the opposite ends of a diameter of the second disc.

5. A damping force generating device according to claim 2, in which, respective cut-outs in the second disc are symmetrical with reference to respective radii, said radii are selected from a group of radii dividing the circumference of the second disc equally into 2n sections and being designated sequentially as 13'-1, 13'-2, . . . 13'-2n and grouped into an odd numbered group 13'-1, 13'-3, . . . and an even numbered group 13'-2, 13'-4, . . . , said first mentioned radii being a pair formed by one selected from the odd numbered group and one selected from the even numbered group.

6. A damping force generating device according to claim 2 in which respective cut-outs in the second disc are symmetrical with reference to respective radii, said radii dividing the circumference of the second disc equally into 2n sections, and respective circumferential angle of said cut-outs being less than 360°/2n.

* * * * *